(No Model.)

G. I. ROCKWOOD.
PIPE COUPLING.

No. 580,058.  Patented Apr. 6, 1897.

Witnesses.
Lena Krster.
John T. McIntyre.

Inventor.
George I. Rockwood.
By his Attorney,
Rufus B. Fowler

UNITED STATES PATENT OFFICE.

GEORGE I. ROCKWOOD, OF WORCESTER, MASSACHUSETTS.

PIPE-COUPLING.

SPECIFICATION forming part of Letters Patent No. 580,058, dated April 6, 1897.

Application filed June 19, 1896. Serial No. 596,195. (No model.)

*To all whom it may concern:*

Be it known that I, GEORGE I. ROCKWOOD, a citizen of the United States, residing at Worcester, in the county of Worcester and State of Massachusetts, have invented a new and useful Improvement in Pipe-Couplings, of which the following is a specification, accompanied by drawings forming a part of the same, in which—

Figure 1:
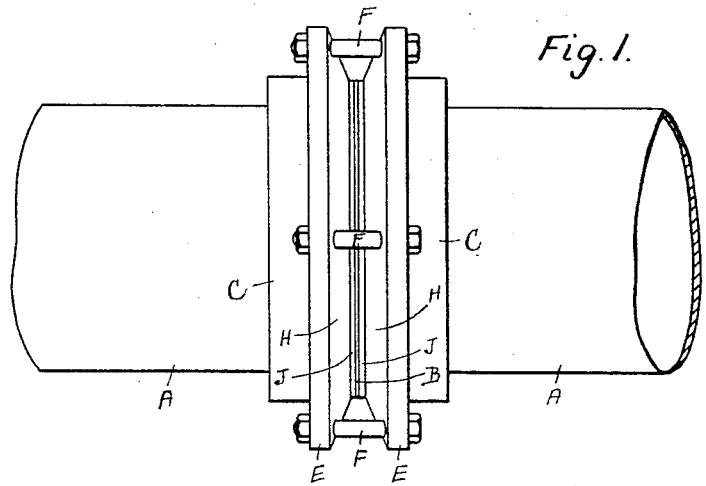
Figure 2:
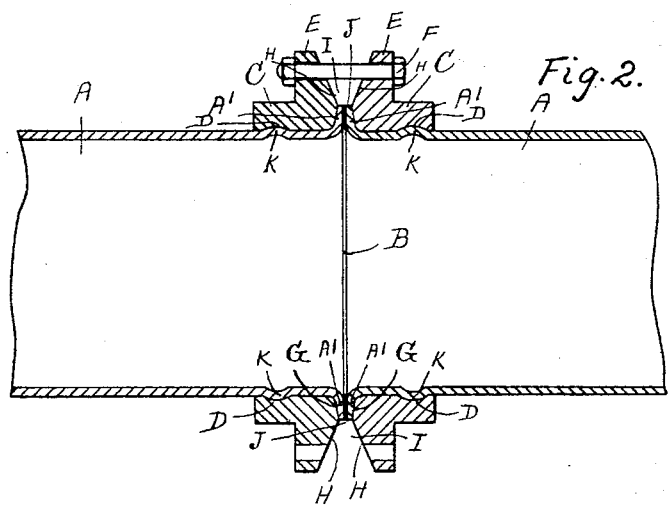

Figure 1 represents a side elevation of the abutting ends of the two pipes united by my improved coupling, and Fig. 2 is a central longitudinal sectional view of the same.

Similar letters refer to similar parts in both figures.

The object of my present invention is to provide an improved coupling for metal pipes, such as steam, water, or gas pipes; and it consists in the construction and arrangement of parts as hereinafter described, and set forth in the annexed claim.

Referring to the accompanying drawings, A A denote portions of two metal pipes which are united by a coupling embodying my invention. At the connected ends are formed flanges A', which are turned outwardly and present abutting surfaces which are either brought into contact with each other or with an interposed gasket B.

The end of each pipe A A is provided with a collar C, having an interior groove D and an exterior flange E, provided with holes to receive tightening-bolts F. The collars C are provided with faces G, which are adapted to press against the flanges A' and bring them firmly against the gasket B by means of the tightening-bolts F.

The collars E from their outer edges to the edges of the flanges A' are provided with the oblique or divergent faces H H, forming an annular opening I, exposing the edges J of the flanges A', thereby allowing the edges J of the flanges to be upset between the faces G G of the collars E E and calking the joint between the flanges or between the flanges and the interposed gasket B. The flanges are formed upon the ends of the pipe with the collar C in position with their faces G G in contact with the flanges. A bead K is formed in the pipe, filling the groove D and preventing the longitudinal movement of the collars on the pipe.

What I claim as my invention, and desire to secure by Letters Patent, is—

The combination with pipes having outwardly-turned flanges at their ends, of collars inclosing said pipes and provided with outward flanges having divergent opposing sides to admit a calking-tool, said collars having faces in contact with said pipe-flanges and serving to resist the blows of the calking-tool, and tightening-bolts held in said collar-flanges, by which the faces of said collars are held in contact with said pipe-flanges, the edges of said pipe-flanges being upset against the faces of said collars in contact therewith, substantially as described.

Dated this 15th day of June, 1896.

GEORGE I. ROCKWOOD.

Witnesses:
RUFUS B. FOWLER,
LENA KESTER.